(12) United States Patent
Wu et al.

(10) Patent No.: US 7,666,299 B2
(45) Date of Patent: Feb. 23, 2010

(54) EXTRACTIVE DISTILLATION PROCESS FOR RECOVERING AROMATICS FROM PETROLEUM STREAMS

(75) Inventors: Kuang-Yeu Wu, Plano, TX (US); Tsung-Min Chiu, Jhonghe (TW); Tzong-Bin Lin, Chiayi (TW); Hung-Chung Shen, Chiayi (TW); Yu-Ming Wu, Guanmiao Township (TW); Tung-Hsiung Kuo, Tainan (TW)

(73) Assignees: AMT International, Inc., Plano, TX (US); CPC Corporation, Taipei (TW)

( * ) Notice: Subject to any disclaimer, the term of this patent is extended or adjusted under 35 U.S.C. 154(b) by 273 days.

(21) Appl. No.: 11/837,459

(22) Filed: Aug. 10, 2007

(65) Prior Publication Data

US 2009/0038991 A1 Feb. 12, 2009

(51) Int. Cl.
*C10G 51/02* (2006.01)
(52) U.S. Cl. .................. 208/313; 208/321; 208/325; 208/326; 208/330; 208/331; 208/333; 208/334
(58) Field of Classification Search .................. 208/313, 208/320–339
See application file for complete search history.

(56) References Cited

U.S. PATENT DOCUMENTS

| | | | | |
|---|---|---|---|---|
| 4,081,355 A | * | 3/1978 | Preusser et al. | 208/313 |
| 5,202,520 A | * | 4/1993 | Forte | 585/808 |
| 5,877,385 A | * | 3/1999 | Lee et al. | 585/807 |

* cited by examiner

*Primary Examiner*—Robert J Hill, Jr.
*Assistant Examiner*—Brian McCaig
(74) *Attorney, Agent, or Firm*—Spencer Chen

(57) ABSTRACT

A process for recovering polar hydrocarbons from non-polar hydrocarbons, such as aromatics from non-aromatics, naphthenes from paraffins and isoparaffins, or olefins from paraffins and isoparaffins, in feed mixtures containing at least a measurable amount of heavier hydrocarbons. This improved extractive distillation (ED) process recovers aromatic hydrocarbons including benzene, toluene, and xylenes from the C6-C8 petroleum streams containing a measurable amount of C9+ hydrocarbons. The ED process also recovers benzene and toluene from the C6-C7 petroleum streams containing a measurable amount of C8+ hydrocarbons. The ED solvent utilized to recover and purify the aromatic hydrocarbons from the petroleum stream with a heavier than intended feedstock of hydrocarbons is also regenerated and recovered.

54 Claims, 4 Drawing Sheets

EXTRACTIVE DISTILLATION PROCESS FOR RECOVERING AROMATICS FROM PETROLEUM STREAMS

BACKGROUND OF THE INVENTION

1. Field of the Invention

The present invention relates to a system and methods for recovering and regenerating extractive distillation (ED) solvent utilized to recover and purify the aromatic hydrocarbons from a petroleum stream. The invention further relates to a method for recovering and regenerating ED solvent from a petroleum stream containing at least a measurable amount of hydrocarbons which are heavier than the intended feedstock. The system and methods can effectively remove and recover the heavy hydrocarbons from a closed solvent loop through mild operating conditions with no additional process energy required.

2. Related Art

In recent history, distillation has continued to be one of the most vital processing steps in the separation of petroleum hydrocarbons and related compounds. These processing steps include specialized distillation processing procedures such as azeotropic distillation and extractive distillation.

Extractive distillation has been used on a greater scale in the chemical processing industry and is a key separation method used in chemical engineering. The separation sequence as employed by the various columns when combined with other separation processes, column and tower internals configurations and operational controls plays an important role in the design of extractive distillation.

One of the most important aspects of the process is the role of the solvent. Many different processes use conventional and novel separating agents such as a solid salt, liquid solvent, a combination of a solid salt and liquid solvent and ionic liquid are key components in the selection of a solvent. One key aspect of extractive distillation is that the separating agent, a solvent with a high boiling point, is added to a components mixture for separation which increases their relative volatility when the components have relatively similar or equal boiling points. For these extractive distillation schemes and processes, the selection of suitable solvent is fundamental to ensure an efficient, thoroughly effective and economical design.

In widespread industrial uses, ED is a commercially proficient unit operating in many applications in recent industrial and chemical processing. In this type of process, a nonvolatile polar solvent is added to the extractive distillation column (EDC) to increase the relative volatility between the polar and non-polar components or mixtures, which have similar or very close boiling points.

In general, the solvent is added to an upper section of the EDC, and the hydrocarbon feed or feedstock is introduced to a middle section of the EDC. On such example of the feedstock is benzene, toluene and xylene, typically referred to as BTX aromatics, which are derived from the double hydrogenation of raw pyrolysis gasoline (RPG). As the nonvolatile solvent descend through the column, it preferentially extracts the polar components to form a rich solvent moving toward the lower or bottom section of the EDC. This allows the non-polar component vapor to ascend to the top of the column. The overhead vapor is condensed and a portion of the condensate is recycled to the top section of the EDC as reflux, while the other portion is withdrawn as the raffinate product.

The rich solvent containing the solvent and the polar components is fed into a solvent recovery column (SRC) to recover the polar components as an overhead product and the lean solvent (free of the feed components) as a bottom product, which is recycled to the upper portion of the EDC and is reused as the extractive solvent. A portion of the overhead product is recycled to the top of the SRC as the reflux to rectify and knock down any entrained solvent in the overhead vapor. The SRC is optionally operated under reduced pressure (typically a vacuum) or a stripping medium or both to reduce the column bottom temperature. This reduce pressure avoids solvent thermo-degradation due to high temperature at the bottom of the column.

Many different ED processes are described in the prior art and other literature, which are hereby incorporated by reference. Some exemplary references are as follows:

---

Aromatic/No-aromatic Separation: U.S. Pat. No. 7,078,580 to L. Tian, et al.; U.S. Pat. No. 4,053,369 to M. Cines; and F. Lee, et al., "Two Liquid-Phase Extractive Distillation for Aromatics Recovery", Ind. Eng. Chem. Res. (26) No. 3, 564-573, 1987.
Diolefin/Olefin Separation: U.S. Pat. No. 4,269,668 to P. Patel.
Cycloparaffin/Paraffin Separation: R. Brown, et al., "Way To Purify Cyclohexane", Hydrocarbon Processing, 83-86, May 1991.

---

Recovering the aromatic hydrocarbons from the mixtures containing the aromatic and non-aromatic hydrocarbons can also be achieved by liquid-liquid extraction (LLE) or ED. Typical ED process configurations and their operations for aromatic hydrocarbon recovery are well known in the art. Most of the recent patents describing LLE distillation processes focus on the "solvent formulation" for improving the aromatics recovery from a particular aromatic feedstock. Although ED process requires less equipment (for example, only 2 instead of 4 separation columns) and have a lower energy requirement, as well as develop less problems during operation, the application of this process is more restricted by narrow boiling range of the feedstock than that of LLE process.

In order to achieve an acceptable aromatic purity and recovery, the solvent needs to keep essentially all benzene (the lightest aromatic compound; boiling at 80.1° C.) in the bottom section of the EDC, thus driving virtually all the heaviest non-aromatics into the overhead section of the EDC. For the narrow boiling-range ($C_6$-$C_7$) of aromatic feedstock, the heaviest non-aromatic compounds include ethylcyclopentane (boiling at 103.5° C.). For the full boiling-range ($C_6$-$C_8$) aromatic feedstock, the heaviest non-aromatic compounds include ethylcyclohexane (131.8° C.).

Therefore, it is much more difficult to recover BTX aromatics from the full boiling-range feedstock, such as the full range pyrolysis gasoline, than to recover benzene and toluene from the narrow boiling-range feedstock, such as the $C_6$-$C_7$ reformate. An ED process which is suitable for the narrow boiling-range aromatic feedstock, may not be able to satisfactorily process the full boiling-range aromatic feedstock.

Another critical problem of the ED process for use in aromatics recovery, which may cause the process to fail or have great inefficiencies, is the existence of measurable amount of heavy ($C_9$-$C_{12}$) hydrocarbons in the ED feedstock, especially for the process for recovering BTX aromatics from the full boiling-range ($C_6$-$C_8$) feedstock. This critical problem has been recognized or discussed in the prior art, probably due to the fact that, up to this point, there are no commercial ED plants for processing full boiling-range aromatic feedstock, such as the full boiling-range ($C_6$-$C_8$) pyrolysis gasoline being reported in operation.

In both ED and LLE processes for aromatics recovery, the solvent is circulated in the process system indefinitely in a closed loop. Normally, the ED or LLE feedstock is fed to a prefractionator for removing the heavy portion of solvent, leaving only the desirable portion to be fed to the EDC or LLE column. Under reasonable operating conditions, even a well designed prefractionator unavoidably slips some measurable amount of heavy hydrocarbons into the feed stream feeding to the EDC or LLE process column. The heavy hydrocarbons in the feed stream would significantly increase under a poorly designed, operated or malfunctioned prefractionator.

To remove the heavy hydrocarbons and the polymerized heavy materials derivate from oxidized solvent, commercial LLE processes use a solvent regenerator where a small slip stream of the lean solvent (approximately one (1%) percent of the lean solvent stream) is heated with or without stripping steam to recover the regenerated solvent or any other heavy components having boiling points which are lower than that of the solvent. The heavy polymeric materials having a boiling point higher than that of the solvent are removed from the bottom of the solvent regenerator as sludge.

G. Asselin U.S. Pat. No. 4,048,062 discloses the LLE process scheme for aromatics recovery, in which a portion of lean solvent (virtually free from hydrocarbons) from the bottom of the SRC is introduced into a solvent regeneration zone. A vaporous stripping medium is also introduced into the solvent regeneration zone separately, recovered with regenerated solvent and introduced into the SRC as at least a portion of the total vaporous stripping medium. The extraction solvent is sulfolane and water mixture. The vaporous stripping medium is steam.

Sulfolane (2,3,4,5-tetrahydrothiophene-1,1-dioxide) is a clear, colorless liquid commonly used in the chemical industry as an extractive distillation solvent or reaction solvent. Sulfolane was originally developed in the 1960s as a solvent to purify butadiene. Sulfolane is an aprotic organosulfur compound, and it is readily soluble in water.

Over the years, the solvent regeneration scheme disclosed in U.S. Pat. No. 4,048,062 has been successfully demonstrated in many Universal Oil Products (UOP) or Institut Français du Pétrole (IFP) designed commercial LLE processes for aromatics recovery using sulfolane and water as the extractive solvent. This is because most of the measurable amount of heavy ($C_9$ to $C_{12}$) hydrocarbons in the feedstock are rejected by the solvent phase in the LLE column and removed with the raffinate phase as a part of the non-aromatic product.

In normal EDC operation for aromatics recovery, however, these heavy hydrocarbons tend to stay with the rich solvent at the bottom of the EDC due to their high boiling points. Even for the narrow boiling-range ($C_6$-$C_7$) feedstock, there can be a measurable amount of heavy ($C_9^+$) hydrocarbons trapped in the solvent, most of which can only be removed from the solvent by increasing the temperature, vacuum level, and stripping steam of the SRC. This method is not a desirable or preferred method of removing the hydrocarbons trapped in the solvent. For the full boiling-range ($C_6$-$C_8$) feed, however, the boiling points of the heavy hydrocarbons, are too high to be stripped from the solvent in the SRC.

Therefore, if these heavy hydrocarbons are not removed from the feed in the upstream prefractionation column, the heavy hydrocarbons will continuously accumulate in the solvent and cause inefficient column and process operation. This is due to the solvent being circulated between the EDC and the SRC indefinitely within a closed loop.

The solvent regeneration scheme disclosed in U.S. Pat. No. 4,048,062, is no longer adequate for the ED process, since it was designed for the LLE process for removing minor amounts of polymeric materials which may possibly be formed from the reactions between the oxidized or decomposed solvent components and trace amounts of the heavy hydrocarbons in the solvent. Using this solvent regeneration scheme in the ED process, the heavy hydrocarbons continuously accumulate and polymerize in the closed solvent loop, until the polymerized materials have boiling points higher that of sulfolane (>287° C.) before they can get out of the closed loop through the bottom of the solvent regenerator. It is a potentially disastrous situation since excessive polymeric materials in the solvent can not only significantly change the solvent properties (more particularly, the selectivity and solvency of the solvent), but can also cause plugging in process equipment, such as pumps, valves, column internals, lines, etc., reducing the efficiency of the system and plant and eventually rendering the ED process inoperable.

In a typical prior art ED process, the aromatic and non-aromatic hydrocarbon feed mixture is introduced into a middle section of the EDC. A water-soluble solvent is more characteristically selective for absorbing the more polar hydrocarbons introduced into an upper section (above the hydrocarbon feed entry point) of the EDC. A rich solvent (extract) stream is recovered from a bottom section of the EDC. The rich solvent (extract) stream contains aromatic hydrocarbons, a measurable amount of heavy ($C_9^+$) hydrocarbons and the water-soluble solvent.

A solvent-free raffinate stream containing non-aromatic hydrocarbons and water is recovered from the top or upper section of the EDC. The overhead raffinate stream is introduced into an overhead receiver, which serves to effect a phase separation between the non-aromatic hydrocarbons and the water phases. A portion of the non-aromatic hydrocarbon phase is recycled to the top section of the EDC as the reflux, while the other portion is withdrawn as the non-aromatic hydrocarbon product. The water phase is then transferred to the steam generator to generate a stripping steam for the SRC and the solvent regenerator, if required.

The rich solvent stream which is removed from the bottom section of the EDC is introduced into a middle section of the SRC, and the stripping steam is injected into a lower section of the SRC to facilitate the removal of the aromatic hydrocarbons from the solvent. An aromatic concentrate, containing water and being substantially free from solvent and non-aromatic hydrocarbons, is withdrawn as an overhead stream from the SRC and introduced into an overhead receiver. The overhead receiver serves to effect a phase separation between the aromatic hydrocarbons phase, which are recovered, and the water phase.

A portion of the aromatic hydrocarbon phase is recycled to a top section of the SRC as the reflux, while the other portion is withdrawn as the aromatic hydrocarbon product. The water phase is transferred to the steam generator to generate the stripping steam for the SRC and the solvent regenerator, if required.

A lean solvent stream containing a measurable amount of heavy ($C_9$-$C_{12}$) hydrocarbons is withdrawn from the bottom section of the SRC. The greater proportion thereof is recycled to the upper section of the EDC as the lean solvent feed.

A portion of the lean solvent is diverted and introduced into a solvent regenerator and, optionally, a vaporous stripping medium (steam) is introduced into the solvent regenerator, through an entry point below the lean solvent feed entry point. The stripping medium (steam) supplied by the steam generator in admixture with regenerated solvent is then introduced into the SRC as at least a portion of the stripping steam for the SRC.

In order to minimize the bottom temperature of the solvent regenerator, the solvent regenerator is operated preferably under the same reduced pressure (vacuum) as the pressure in the SRC Regenerated solvent containing heavy materials (with boiling points below the solvent boiling point) and substantially all the steam, is recovered as an overhead stream of the solvent regenerator and introduced into the bottom or lower section of the SRC as a part of the stripping steam, or if stripping steam is not used, mixed directly into the lean solvent from the bottom section of the SRC. Deteriorated solvent products and polymeric sludge are removed as a bottom stream of the solvent regenerator.

Degradation of the sulfolane solvent occurs at temperatures above 200° C. in an inert atmosphere and increases significantly in oxygen-containing atmosphere, where air leaks through the ED process equipment. The primary products from degradation of sulfolane are sulfur dioxide and oxygen-containing organic compounds, such as aldehydes, organosulfonic acids, carboxylic acids, etc.

Further interactions among the primary products can lead to undesirable polymeric materials and sludge. To prevent corrosion of the process equipment, monoethanolamine (MEA) is normally used to neutralize acidic materials and adjust the pH value of the sulfolane solvent. The heavy salts produced from acid neutralization along with other solvent additives, such as antifoaming agents, are also removed as a part of the sludge from bottom of the solvent regenerator.

It would be desirable to have a system and methods which reduces the sludge and plugging in the system. The system and methods would operate a similar conditions through all the components of the system and recover the solvent in an efficient method. The system and methods would be easy to operate and control with a reducing in plant energy requirements, conserve raw materials and be easier to maintain.

SUMMARY OF INVENTION

One aspect of the present invention is a method for recovering a polar hydrocarbon selective, water-soluble aqueous solvent substantially free of hydrocarbons and other impurities from a solvent-rich stream containing the selective aqueous solvent, water, a measurable amount of heavy hydrocarbons, and sludge which are generated from the reactions of a thermally decomposed or oxidized solvent, heavy hydrocarbons, and additives.

In one embodiment of the present invention, a feed containing polar and non-polar hydrocarbons introduced into a middle portion of an extractive distillation column (EDC) and a solvent-rich stream is fed into an upper portion of the EDC as the selective solvent feed. A water-containing non-polar hydrocarbon-rich stream is recovered from the upper portion of the EDC. A first solvent-rich stream containing the aqueous solvent and the polar hydrocarbons is recovered from a bottom portion of the EDC. The first solvent-rich stream is introduced into a middle portion of a solvent recovery column (SRC) and a polar hydrocarbon-rich stream, substantially free from said aqueous solvent and said non-polar hydrocarbons is recovered from an upper portion of the SRC. A second solvent-rich stream is removed from a bottom portion of the SRC and a greater portion of the second solvent-rich stream is fed into the upper portion of the EDC. A minor fraction of the second solvent-rich stream into an upper portion of a solvent regeneration zone and a third solvent-rich stream containing said aqueous solvent, water and any hydrocarbons and other compounds having boiling points lower than or equal to that of said aqueous solvent is recovered from the upper portion of the solvent regeneration zone. Any heavy sludge is removed from a lower portion of the solvent regeneration zone. Water from the non-polar hydrocarbon-rich stream removed from the upper portion of the ED and water from a polar hydrocarbon-rich stream from the upper portion of the SRC is separated and introduced into a lower portion of a solvent washing zone. The third solvent-rich stream is condensed and cooled and introduced into a solvent washing zone through a point above the section where the water is fed into the solvent washing zone. The aqueous solvent in an aqueous phase is recovered from a lower portion of the solvent washing zone. The heavy hydrocarbons in an oil phase is rejected and withdrawn from an accumulated oil phase in the upper portion of the solvent washing zone. Any sludge is discharged from the bottom portion of the solvent washing zone.

In another aspect of the invention, the aqueous phase from the solvent washing zone is fed into a steam generator and vaporized to form steam. A portion of the steam is fed into each of the lower portion of the solvent regeneration zone and the lower portion of the SRC. In yet another aspect of the invention, the steam is introduced into a steam generator to produce energy before feeding into the solvent regeneration zone and/or the SRC.

In one aspect of the invention, the polar hydrocarbons are aromatic and non-polar hydrocarbons are paraffinic, naphthenic, and olefinic. In another embodiment, the water-soluble, aqueous solvent is selected from the list comprising sulfolane, alkyl-sulfolane, N-formyl morpholine, N-methyl pyrrolidone, tetraethylene glycol, triethylene glycol, diethylene glycol, and mixtures thereof. In one aspect, the water-soluble solvent is aqueous sulfolane, in another aspect, the water-soluble solvent is aqueous N-formyl morpholine, in an alternate aspect, the water-soluble solvent is aqueous N-methyl pyrrolidone, and in yet another aspect, the water-soluble solvent is aqueous tetraethylene glycol.

In one embodiment of the invention, the solvent washing zone is a continuous multi-stage counter-current contacting device, including a column with trays, a column with packings, a column with rotating discs, a pulse column, multi-stage mixers/settlers, or any other rotating type contactor. In another embodiment, the solvent washing zone is a simple water tank serving as a decanter to separate heavy hydrocarbons and any sludge from the aqueous phase containing primarily the solvent and water.

In one aspect of the invention, the solvent washing zone is operated at a temperature of 0° to 100° C. and a pressure of 1 to 100 atmospheres. In another aspect of the invention, the solvent washing zone is operated at a temperature of 25° to 80° C. and a pressure of 1 to 10 atmospheres. In one alternate aspect, the solvent washing zone is operated under a washing water-to-solvent feed weight ratio of 0.1 to 100 and in yet another aspect, the solvent washing zone is operated under a washing water-to-solvent feed weight ratio of 0.5 to 10.

In one embodiment of the invention, the solvent regeneration zone is a continuous multi-stage contacting device, including a column with trays or a column with packings, with a reboiler. In another embodiment of the invention, the solvent regeneration zone is operated at a temperature of 150° to 200° C., and a pressure of 0.1 to 10 atmospheres. In yet another embodiment, the solvent regeneration zone is operated at a temperature of 160° to 180° C., and a pressure of 0.1 to 0.8 atmospheres. In an alternate embodiment, the solvent regeneration zone is operated under a steam-to-solvent weight from 0.01 to 5.0. In yet another embodiment of the invention, the solvent regeneration zone is operated under a steam-to-solvent weight from 0.1 to 2.0.

One aspect of the present invention is where the EDC is operated under such conditions to maximize the benzene recovery in said first solvent-rich stream by keeping substantially all $C_9^+$ hydrocarbons in the first solvent-rich stream. In another aspect of the invention, the SRC is operated under such conditions to strip only $C_8$ and lighter hydrocarbons from the first solvent-rich stream and to keep substantially all $C_9$ and heavier hydrocarbons in the second solvent-rich stream.

Another aspect of the present invention is a method for recovering a polar hydrocarbon selective, water-soluble solvent substantially free of hydrocarbons and other impurities from a solvent-rich stream containing the aqueous solvent, water, a measurable amount of heavy hydrocarbons, and sludge generated from reactions of a thermally decomposed or oxidized solvent, heavy hydrocarbons and additives A feed containing polar and non-polar hydrocarbons is introduced into a middle portion of an extractive distillation column (EDC) and a solvent-rich stream is introduced into an upper portion of the EDC as the selective solvent feed.

A water-containing non-polar hydrocarbon-rich stream is recovered from the upper portion of the EDC and the first solvent-rich stream containing the aqueous solvent and the polar hydrocarbons from a lower portion of the EDC. The first solvent-rich stream is introduced into a middle portion of a solvent recovery column (SRC). A polar hydrocarbon-rich stream, substantially free from solvent and non-polar hydrocarbons, is recovered from an upper portion of the SRC. A second solvent-rich stream is removed from a lower portion of the SRC.

A greater portion of the second solvent-rich stream is fed into the upper portion of the EDC as the selective solvent feed and a minor portion of the second solvent-rich stream is fed into an upper portion of a solvent washing zone. Water from the non-polar hydrocarbon-rich stream removed from the upper portion of the EDC and water from said polar hydrocarbon-rich stream from the upper portion of the SRC is separated and introduced into a lower portion of the solvent washing zone at a point below where the minor portion of the second solvent-rich stream is fed into the solvent washing zone.

The aqueous solvent is recovered from the aqueous phase and the heavy hydrocarbons rejected in the oil phase is recovered in the solvent washing zone by withdrawing an accumulated oil phase containing said heavy hydrocarbons from the upper portion of the solvent washing zone, recovering an aqueous phase containing the aqueous solvent from the lower portion of the solvent washing zone, and discharging any sludge from lower portion of the solvent washing zone.

The aqueous phase from the solvent washing zone is further fed into a steam generator and vaporized to form steam. The steam is then fed into the lower portion of the SRC.

In one aspect of the invention, the polar hydrocarbons are aromatic and non-polar hydrocarbons are paraffinic, naphthenic, and olefinic. In another embodiment, the water-soluble, aqueous solvent is selected from the list comprising sulfolane, alkyl-sulfolane, N-formyl morpholine, N-methyl pyrrolidone, tetraethylene glycol, triethylene glycol, diethylene glycol, and mixtures thereof. In one aspect, the water-soluble solvent is aqueous sulfolane, in another aspect, the water-soluble solvent is aqueous N-formyl morpholine, in an alternate aspect, the water-soluble solvent is aqueous N-methyl pyrrolidone, and in yet another aspect, the water-soluble solvent is aqueous tetraethylene glycol.

In one embodiment of the invention, the solvent washing zone is a continuous multi-stage counter-current contacting device, including a column with trays, a column with packings, a column with rotating discs, a pulse column, multi-stage mixers/settlers, or any other rotating type contactor. In another embodiment, the solvent washing zone is a simple water tank serving as a decanter to separate heavy hydrocarbons and any sludge from the aqueous phase containing primarily the solvent and water.

In one aspect of the invention, the solvent washing zone is operated at a temperature of 0° to 100° C. and a pressure of 1 to 100 atmospheres. In another aspect of the invention, the solvent washing zone is operated at a temperature of 25° to 80° C. and a pressure of 1 to 10 atmospheres. In one alternate aspect, the solvent washing zone is operated under a washing water-to-solvent feed weight ratio of 0.1 to 100 and in yet another aspect, the solvent washing zone is operated under a washing water-to-solvent feed weight ratio of 0.5 to 10.

One aspect of the present invention is where the EDC is operated under such conditions to maximize the benzene recovery in said first solvent-rich stream by keeping substantially all $C_9^+$ hydrocarbons in the first solvent-rich stream. In another aspect of the invention, the SRC is operated under such conditions to strip only $C_8$ and lighter hydrocarbons from the first solvent-rich stream and to keep substantially all $C_9$ and heavier hydrocarbons in the second solvent-rich stream.

A yet another aspect of the present invention is directed towards a system for recovering a polar hydrocarbon selective, water-soluble solvent from a solvent-rich stream. The solvent-rich stream contains the selective solvent, water, a measurable amount of heavy hydrocarbons, and sludge generated from reactions of a thermally decomposed or oxidized solvent, heavy hydrocarbons and additives. A feed stream containing polar and non-polar hydrocarbons is fed into a middle portion of an extractive distillation column (EDC) and a solvent-rich stream fed into an upper portion of the EDC as a selective solvent feed. A water-containing non-polar hydrocarbon-rich stream is recovered from the upper portion of the EDC and a first solvent-rich stream containing the selective solvent and the polar hydrocarbons is withdrawn from a lower portion of the EDC. The first solvent-rich stream is fed into a middle portion of a solvent recovery column (SRC), and a polar hydrocarbon-rich stream, substantially free from solvent and non-polar hydrocarbons, is recovered from an upper portion of the SRC. A second solvent-rich stream is removed from a lower portion of the SRC. A greater portion of the second solvent-rich stream is fed into the upper portion of the EDC as the selective solvent feed and a minor portion of the second solvent-rich stream is fed into an upper portion of a solvent washing zone.

The system contains a water separating means wherein water is separated from the non-polar hydrocarbon-rich stream removed from the upper portion of the EDC and water is separated from the polar hydrocarbon-rich stream removed from the upper portion of the SRC. All or a part of the water from the water separating means is fed into a lower portion of the solvent washing zone at a level below where a minor portion of the second solvent-rich stream is introduced into the solvent washing zone. Alternatively, the water may be sent to a solvent recovery zone.

In one aspect, the system contains a recovery zone where the selective solvent in the aqueous phase is recovered and the heavy hydrocarbons are rejected in an oil phase in the solvent washing zone. The heavy hydrocarbons are withdrawn in an accumulated oil phase from the upper portion of the solvent washing zone and the aqueous phase containing the selective solvent is recovered from the lower portion of the solvent washing zone. Any sludge is discharged from a lower portion of the solvent washing zone.

In another aspect of the present invention, a vaporizing means wherein the aqueous phase from the solvent washing zone is fed into a steam generator and vaporized to form steam. The system further contains a steam recovery zone wherein the steam generated from the vaporizing means is returned to the lower portion of the SRC.

In an alternate aspect of the invention, the system generates a selective aqueous solvent which is substantially free of hydrocarbons and other impurities. Energy is also produced from the generation of steam in the steam recovery zone.

In one embodiment of the invention, the polar hydrocarbons of the system are aromatic and non-polar hydrocarbons are paraffinic, naphthenic, and olefinic. In another embodiment, the water-soluble, aqueous solvent is selected from the list comprising sulfolane, alkyl-sulfolane, N-formyl morpholine, N-methyl pyrrolidone, tetraethylene glycol, triethylene glycol, diethylene glycol, and mixtures thereof. In one aspect, the water-soluble solvent of the system is aqueous sulfolane, in another aspect, the water-soluble solvent is aqueous N-formyl morpholine, in an alternate aspect, the water-soluble solvent is aqueous N-methyl pyrrolidone, and in yet another aspect, the water-soluble solvent is aqueous tetraethylene glycol.

In another aspect of the invention, the solvent washing zone of the system is a continuous multi-stage counter-current contacting device, including a column with trays, a column with packings, a column with rotating discs, a pulse column, multi-stage mixers/settlers, or any other rotating type contactor. In another embodiment, the solvent washing zone is a simple water tank serving as a decanter to separate heavy hydrocarbons and any sludge from the aqueous phase containing primarily the solvent and water.

In one aspect of the invention, the solvent washing zone of the system is operated at a temperature of 0° to 100° C. and a pressure of 1 to 100 atmospheres. In another aspect of the invention, the solvent washing zone is operated at a temperature of 25° to 80° C. and a pressure of 1 to 10 atmospheres. In one alternate aspect, the solvent washing zone is operated under a washing water-to-solvent feed weight ratio of 0.1 to 100 and in yet another aspect, the solvent washing zone is operated under a washing water-to-solvent feed weight ratio of 0.5 to 10.

In one aspect of the present invention, the EDC in the system is operated under such conditions to maximize the benzene recovery in said first solvent-rich stream by keeping substantially all $C_9^+$ hydrocarbons in the first solvent-rich stream. In another aspect of the invention, the SRC is operated under such conditions to strip only $C_8$ and lighter hydrocarbons from the first solvent-rich stream and to keep substantially all $C_9$ and heavier hydrocarbons in the second solvent-rich stream.

DETAILED DESCRIPTION OF THE INVENTION

Figure 1:
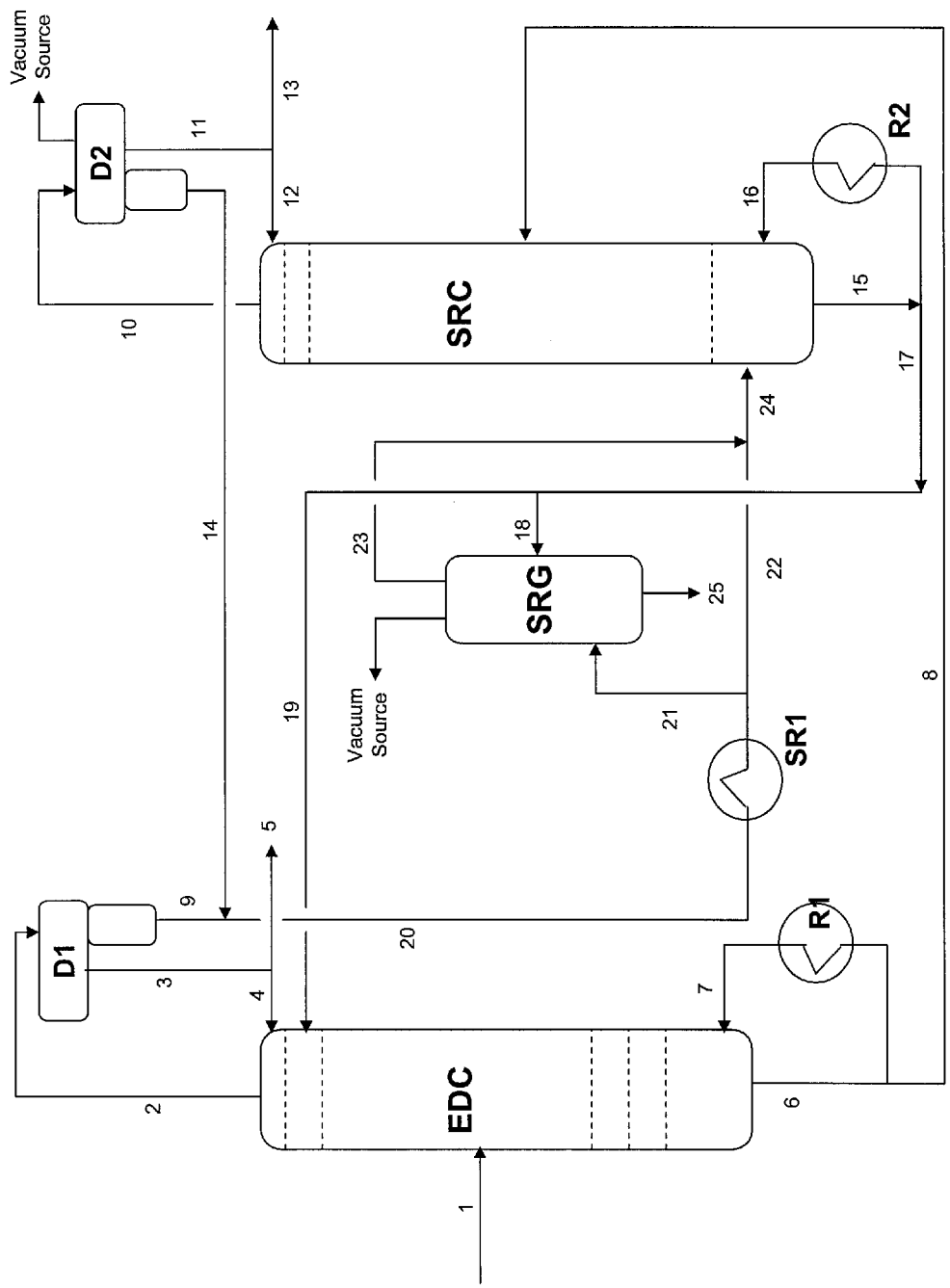
FIG. 1 is a schematic diagram of a prior art ED process for aromatic hydrocarbons recovery from the aromatic and non-aromatic hydrocarbon mixtures, in which the solvent is regenerated through heating with steam stripping under reduced pressure in a solvent regenerator.

This invention provides an improved extractive distillation (ED) process for recovering polar hydrocarbons from non-polar hydrocarbons, such as aromatics from non-aromatics, naphthenes from paraffins and isoparaffins, or olefins from paraffins and isoparaffins, in feed mixtures containing at least a measurable amount of heavier hydrocarbons which are extracted from petroleum streams. In one of its specific applications, this invention relates to an improved ED process for recovering aromatic hydrocarbons including benzene, toluene, and xylenes (BTX aromatics) from the $C_6$-$C_8$ petroleum streams containing at least a measurable amount of $C_9^+$ hydrocarbons.

In another specific application, this invention relates to an improved ED process for recovering mainly benzene and toluene from the $C_6$-$C_7$ petroleum streams containing at least a measurable amount of $C_8^+$ hydrocarbons. More specifically, this invention is directed toward the regeneration and recovery of the ED solvent utilized to recover and purify the aromatic hydrocarbons from the petroleum stream containing at least a measurable amount of hydrocarbons heavier than intend feedstock.

One of the aspects of this invention is to provide improved solvent regeneration systems for the ED process to significantly reduce the amount of heavy ($C_9$-$C_{12}$) hydrocarbons trapped in the closed solvent loop, and thus maintain the solvent performance, reduce the amount of solvent to be regenerated per cycle, and recover the value of heavy hydrocarbons.

Another embodiment of this invention is to eliminate the high temperature, energy intensive, and difficult-to-operate solvent regenerator by replacing it with a low temperature, energy saving and easy-to-operate solvent regeneration system, for the ED processes. Additionally, energy may also be generated by the system according to the present invention.

An alternate embodiment of this invention is to improve the benzene recovery in the EDC by allowing increased amount of $C_9^+$ hydrocarbons to slip into the rich solvent with the BTX aromatics in the EDC bottom, since the $C_9^+$ hydrocarbons can be removed from the closed solvent loop by a preferred embodiment of this invention.

A still further aspect of this invention is to eliminate the xylene column, which separates the xylene product from the $C_9^+$ hydrocarbons in the aromatic product section of the ED process, by keeping substantially all the $C_9^+$ hydrocarbons at the bottom of the SRC with the lean solvent, since it can be removed from the closed solvent loop by a preferred embodiment of this invention.

In accordance with one of the embodiments of this invention, the regenerated solvent (optionally, mixed with stripping steam) from an overhead or upper portion of a solvent regenerator is introduced into a low temperature, energy saving and easy-to-operate solvent washing zone after cooling. The water phases collected from one or both of the overhead receivers of the EDC and the SRC are introduced into the solvent washing zone, to contact the regenerated solvent. At minimum, the solvent washing zone can serve as a decanter to remove and separate the minor heavy hydrocarbon phase from the bulk aqueous solvent phase. The decanted hydrocarbon phase is accumulated and withdrawn from top of the decanter periodically.

Preferably, the washing water contacts the regenerated solvent in a counter-current fashion to extract the solvent into the water phase, and to reject the heavy hydrocarbons and other water-insoluble products into the oil phase. The water phase containing essentially all of the solvent is withdrawn continuously from a lower portion of the decanter (or, contactor) or contactor and introduced into the steam generator not only as a partial source of stripping steam for the SRC, but also as a way to recycle the purified solvent into the solvent loop. The minor oil phase is accumulated on the light liquid phase (or, upper portion) of the decanter (or, contactor) and is removed periodically from the contactor under level control. Any solid precipitation formed in the solvent washing zone is removed from the bottom portion of the contactor.

In accordance with another preferred embodiment of this invention, the high temperature, energy intensive, and difficult-to-operate solvent regenerator is eliminated from the solvent regeneration scheme, and is replaced with a more efficient, low temperature, energy saving and easy-to-operate solvent washing system. A portion of the lean solvent that is withdrawn from a bottom portion of the SRC is diverted and introduced into a solvent washing zone after cooling. The water phases collected from one or both of the overhead receivers of the EDC and the SRC are introduced into the solvent washing zone, to contact the diverted lean solvent stream.

At minimum, the solvent washing zone can serve as a decanter to remove and separate the minor heavy hydrocarbon phase from the bulk aqueous solvent phase. The decanted hydrocarbon phase is accumulated and withdrawn from top of the decanter periodically. The solvent washing operation is preferably conducted in any continuous multi-stage contacting device, more preferably in a device that is designed for counter-current extraction. Suitable designs include columns with trays, columns with packings, columns with rotating discs, pulse columns, multi-stage mixers/settlers, and any other rotating type contactors.

Preferably, the washing water contacts the lean solvent in a counter-current fashion to extract the solvent into the water phase and to reject the heavy hydrocarbons and other water-insoluble products into the oil phase. Any solid sludge formed during the water washing operation is collected at the bottom section of the contactor. The water phase containing essentially the purified solvent is withdrawn continuously from the bottom section of the contactor (or, decanter) and introduced into the steam generator not only as a partial source of stripping steam for the SRC, but also as a way to recycle the purified solvent into the solvent loop.

The minor oil phase is accumulated on a top section of the contactor and is removed periodically from the contactor (or decanter) under interface level control. The solid sludge is withdrawn from the bottom section of the contactor by suitable means.

In both of these embodiments, due to the fact that the $C_9^+$ heavy hydrocarbons are recovered from the lean solvent in the solvent washing zone, the EDC is operated under such conditions to maximize the benzene recovery by keeping substantially all $C_9$ hydrocarbons in the bottom of the EDC with the rich solvent (extract) stream. The SRC is operated under such conditions to strip only $C_8$ and lighter hydrocarbons from the rich solvent stream and to keep substantially all $C_9$ and heavier hydrocarbons in the bottom of the SRC with the lean solvent stream.

Knowing that the olefinic hydrocarbons are more concentrated in the heavy hydrocarbons fraction, the other aspect of this invention is to significantly reduce the load of clay tower for olefinic hydrocarbons removal from the aromatic product, by keeping substantially all the $C_9^+$ hydrocarbons at the bottom of the SRC with the lean solvent, since it can be removed from the closed solvent loop by a representative embodiment of this invention.

The techniques of our present invention are intended for integration into an ED process for the selective separation and recovery of the polar hydrocarbons from a mixture thereof with non-polar hydrocarbons. Although the techniques are applicable to a multitude of hydrocarbon mixtures, the following discussion will be directed primarily to the separation and recovery of aromatic hydrocarbons from a mixture with non-aromatics, including paraffins, isoparaffins, naphthenes, and/or olefins.

One of the ED processes for aromatics recovery as described in the prior art is illustrated in FIG. 1. It is mainly comprised of an extractive distillation column (EDC), a solvent recovery column (SRC) and a solvent regenerator (SRG). A hydrocarbon feed containing a mixture of aromatic and non-aromatic hydrocarbons is fed via line 1 to a middle section of the EDC, while a lean solvent from the bottom of the SRC is fed via lines 15, 17 and 19 to near a top section of the EDC below an overhead reflux entry point. Non-aromatics vapor exiting the top of the EDC through line 2 is condensed (the condenser is not shown for clarity) and transferred to an overhead receiver D1, which serves to effect a phase separation between the non-aromatic hydrocarbons and the water phases.

A first portion of the non-aromatic hydrocarbon phase is recycled to a top section of the EDC as reflux via line 4, while a second portion of the non-aromatic hydrocarbon phase is withdrawn as the non-aromatic hydrocarbon product through line 5. The water phase is transferred to a steam generator SR1 via lines 9 and 20 to form a stripping steam to be introduced into the SRC via lines 22 and 24, and to introduce into the solvent regenerator SRG via line 21.

The rich solvent stream containing the solvent, the aromatic hydrocarbons, and measurable heavy hydrocarbons is withdrawn from the bottom section of the EDC via line 6. A portion of the rich solvent is heated in a reboiler R1 and recycled to the bottom section of the EDC via line 7 to generated vapor stream in the column, while the remaining portion of the rich solvent is fed to a middle section of the SRC through line 8.

Stripping steam is injected via line 24 into a lower section of the SRC to assist the removal of aromatic hydrocarbons from the rich solvent. An aromatic concentrate, containing water and being substantially free from solvent and non-aromatic hydrocarbons, is withdrawn through line 10 as an overhead vapor stream from the SRC and introduced into an overhead receiver D2 after condensing (the condenser is not shown for clarity). The overhead receiver serves to effect a phase separation between the aromatic hydrocarbons phase, which are recovered, and the water phase.

A first portion of the aromatic hydrocarbon phase is recycled to a top section of the SRC as the reflux via line 12, while a second portion of the aromatic hydrocarbon phase is withdrawn as the aromatic hydrocarbon product through line 13. The water phase is transferred through lines 14 and 20 to the steam generator SR1 to form the stripping steam for the SRC and the SRG.

In order to minimize the bottom temperature of the SRC, the overhead receiver D2 is connected to a vacuum source to generate sub-atmospheric condition in the SRC. A lean solvent stream containing a measurable amount of heavy ($C_9$-$C_{12}$) hydrocarbons is withdrawn from a bottom portion of the SRC through line 15. The greater proportion of the solvent stream thereof is recycled via lines 17 and 19 to an upper portion of the EDC as the lean solvent feed for absorbing the aromatic hydrocarbons in the EDC.

A portion of the lean solvent is diverted and introduced into the SRG via line 18 and steam is introduced into the solvent regenerator through line 21, at an entry point below the lean solvent feed entry point. Deteriorated solvent and polymeric sludge are removed as a bottom stream through line 25 while the regenerated solvent containing heavy materials (with boiling points below the solvent boiling point) and substantially all the stripping steam, is recovered as an overhead stream and introduced into a lower section of the SRC via lines 23 and 24 as a part of the stripping steam. To minimize the bottom temperature of the SRG, it is preferably operated under the same reduced pressure (vacuum) as the SRC, at the location where the regenerated solvent (mixed with stripping steam) is introduced into the SRC.

Referring to FIG. 1, during column operation, a full-boiling range feed was fed to the middle portion of an extractive distillation column (EDC) via line 1. Lean solvent (sulfolane with water) from the bottom of the SRC column was fed to the upper portion of the EDC via lines 15, 17, and 19, under a pre-determined solvent-to-feed ratio. The raffinate stream was then withdrawn from the top of EDC through line 2 through a condenser (not shown) into a phase separator to decant the water phase. A portion of the raffinate is recycled to the EDC as the reflux via line 4 and the remaining portion is taken the raffinate product through line 5. Rich solvent is withdrawn from the bottom of EDC and send to the middle of portion of the SRC through lines 6 and 8.

Nearly all the heavy ($C_9^+$) hydrocarbons in the feed stay at the bottom of the EDC with the rich solvent, while the raffinate stream from the top of the EDC contains only trace of $C_9^+$ hydrocarbons. In a normal operation the SRC is operated with stripping steam at a reboiler temperature in the range of 170° to 185° C. under a reduced pressure in the range of 0.4 to 0.7 atmospheric pressure. Higher temperatures would cause accelerated thermal decomposition of sulfolane (hourly decomposition rate is approximately 0.001 to 0.01% when temperatures exceed 200° C.).

Under normal operating conditions, the SRC overhead (aromatic) product contains all the $C_6$ to $C_8$ aromatics, a portion of $C_9$ aromatics, and trace of $C_{10}$ aromatics. Therefore, a portion of C9 hydrocarbons and essentially all the $C_{10}^+$ hydrocarbons in the rich solvent will stay at the bottom of the SRC with the lean solvent. Thus, this amount of heavy components from the feeds in the lean solvent would overburden the SRG and could cause the solvent performance to deteriorate quickly rendering the ED process inoperable, even at much higher solvent regeneration rate.

Figure 2:
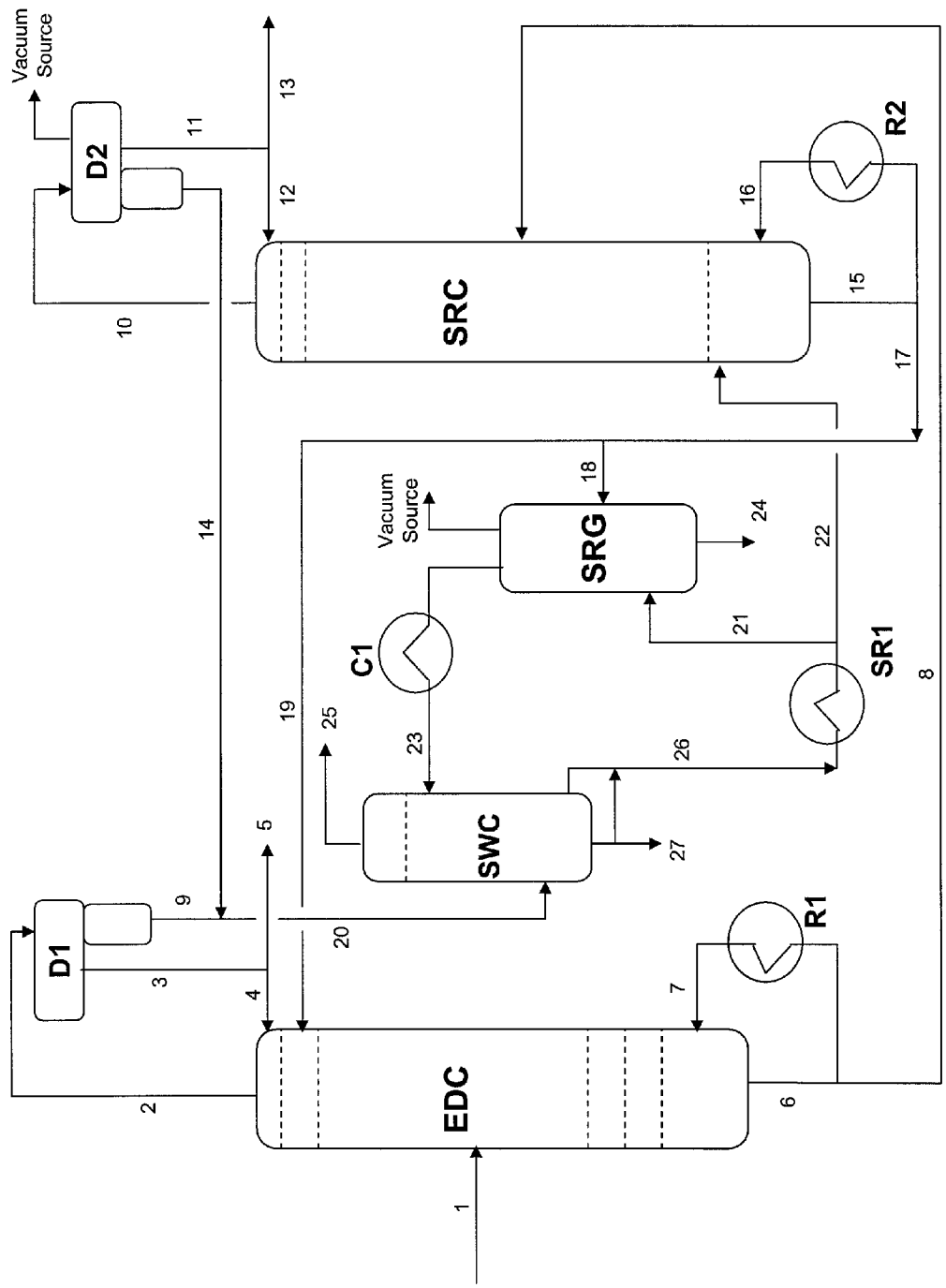
FIG. 2 is a schematic diagram of an embodiment of the present invention for aromatic hydrocarbons recovery from the mixtures of aromatic and non-aromatic hydrocarbons, in which the solvent is regenerated through the prior art solvent regenerator in combination with a solvent washing contactor using water.

FIG. 2 is a schematic diagram of the ED process for aromatic hydrocarbon recovery from petroleum streams according to one embodiment of the present invention. Referring to FIG. 2, an overhead vapor from the solvent regenerator SRG containing the solvent, a measurable amount of heavy materials (with boiling points below the solvent boiling point) and substantially all the stripping steam, is directed to a cooler C1 instead of being fed to the SRC.

When sulfolane is used as the solvent, the temperature of the overhead vapor from the SRG is from 150° to 200° C., and preferably from 160° to 180° C., under a pressure of 0.1 to 10 atmospheres, and preferably of 0.1 to 0.8 atmospheres. This vapor is condensed and cooled in the cooler C1 to a temperature approximately of 0 to 100° C., preferably of 25 to 80° C., and is introduced via line 23 into an upper section of the solvent washing contactor SWC below the location of aqueous/oil interface. Water phases collected from both of the overhead receivers of the EDC and the SRC are introduced via lines 9, 14 and 20 into a lower section the SWC, to contact the solvent phase counter-currently.

Suitable designs of SWC include columns with trays, columns with packings, columns with rotating discs, pulse columns, or columns with static mixers. The washing water phase contacts the solvent phase to extract the solvent into the aqueous solvent phase and rejects the heavy hydrocarbons and other water-insolubles into the oil phase. Washing water-to-solvent feed weight ratio is from 0.1 to 100, and preferably from 0.5 to 10. Water extraction temperature in the SWC is ranging 0° to 100° C., and preferably from 25 to 80° C.

The operating pressure of the SWC is from 1 to 100 atmospheres, and preferably from 1 to 10 atmospheres. The water phase containing essentially the purified sulfolane is continuously withdrawn from a lower portion of the SWC and is introduced through line 26 into the steam generator SR1 not only as the source of stripping steam for the SRC via line 22 and for SRG via line 21, but also as a way to recycle the purified sulfolane into the solvent loop.

The minor oil phase is accumulated on at a top section of the SWC and is removed periodically from the overhead section of the SWC via line 25 under interface level control. Any solid precipitation forming in the SWC is removed from the bottom via line 27. The solvent washing operation may also be conducted in any other continuous multi-stage contacting device, preferably one that is designed for counter-current extraction, such as multi-stage mixers/settlers, or any other rotating type contactors.

Figure 3:
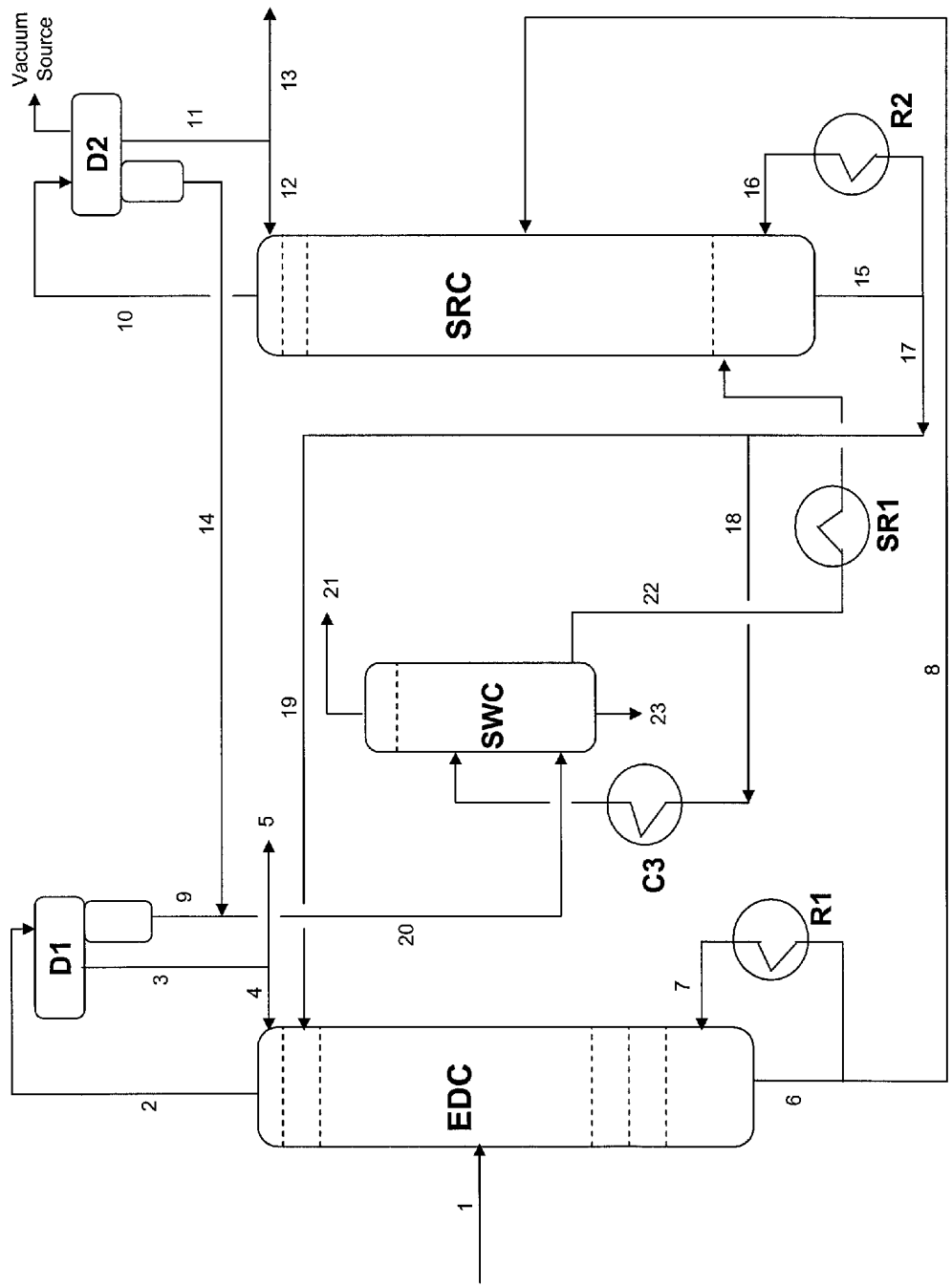
FIG. 3 is a schematic diagram of another embodiment of the present invention for aromatic hydrocarbon recovery from the mixtures of aromatic and non-aromatic hydrocarbons, in which the solvent is regenerated through a solvent washing contactor using water alone.

FIG. 3 illustrates another embodiment for aromatic hydrocarbons recovery from the aromatic hydrocarbon and non-aromatic hydrocarbon mixtures in petroleum streams according to the present invention. A low temperature and low pressure solvent washing contactor using water alone is used to regenerate the solvent. The high temperature, energy intensive and difficult-to-operate conventional solvent regenerator is eliminated from the solvent regeneration scheme and process.

According to FIG. 3, a portion of the lean solvent withdrawn from a bottom section of the SRC is diverted through line 18 and cooled in a cooler C3 to a temperature of approximately 0 to 100° C., preferably of 25 to 80° C. The cooled lean solvent is then fed into an upper section of the solvent washing contactor SWC below the location of the aqueous/oil interface. Since the density of water is lower than that of lean solvent, the water phases collected from one or both of the overhead receivers of the EDC and the SRC are introduced into a lower section of the SWC via line 20, to contact the lean solvent counter-currently.

The SWC should contain continuous multi-stage contacting device, preferably one that is designed for counter-current extraction. Suitable designs of SWC include columns with trays, columns with packings, columns with rotating discs, and pulse columns. In the SWC, the washing water phase contacts the lean solvent phase to extract the solvent into the water phase, and rejects the heavy hydrocarbons and other water-insoluble into the oil phase. The washing water-to-solvent feed weight ratio is from 0.1 to 100, and preferably from 0.5 to 10. The water extraction temperature in the SWC ranges from 0 to 100° C., and preferably from 25 to 80° C.

The operating pressure of the SWC is from 1 to 100 atmospheres, and preferably from 1 to 10 atmospheres. The water phase containing essentially the purified sulfolane is continuously withdrawn from a lower section of the SWC and introduced through line 22 into steam generator SR1 not only as the stripping steam for the SRC, but also as a way to recycle the purified sulfolane into the solvent loop.

The minor oil phase is accumulated at a top section of the SWC and is removed periodically from the overhead section of the SWC via line 21 under interface level control. The solvent washing operation may also be conducted in any other continuous multi-stage contacting device, preferably one that is designed for counter-current extraction, such as multi-stage mixers/settlers, or any other rotating type contactors. Any solid sludge formed during the water washing operation is collected at a bottom section of the SWC and drained periodically through line 23 by any suitable means.

In both FIGS. 2 and 3, the operating condition of EDC is adjusted to keep substantially all benzene (the lightest aromatic hydrocarbon) in a bottom portion of the EDC to maximize its recovery by allowing substantially all $C_9^+$ hydrocarbons in the bottom portion of the EDC with the rich solvent (extract) stream. The operating condition of SRC is also modified to strip only $C_8$ and lighter hydrocarbons from the rich solvent stream and to keep substantially all $C_9$ and heavier hydrocarbons in the bottom of the SRC with the lean solvent stream. This is because the $C_9^+$ hydrocarbons can be recovered from the lean solvent in the solvent washing zone.

Figure 4:
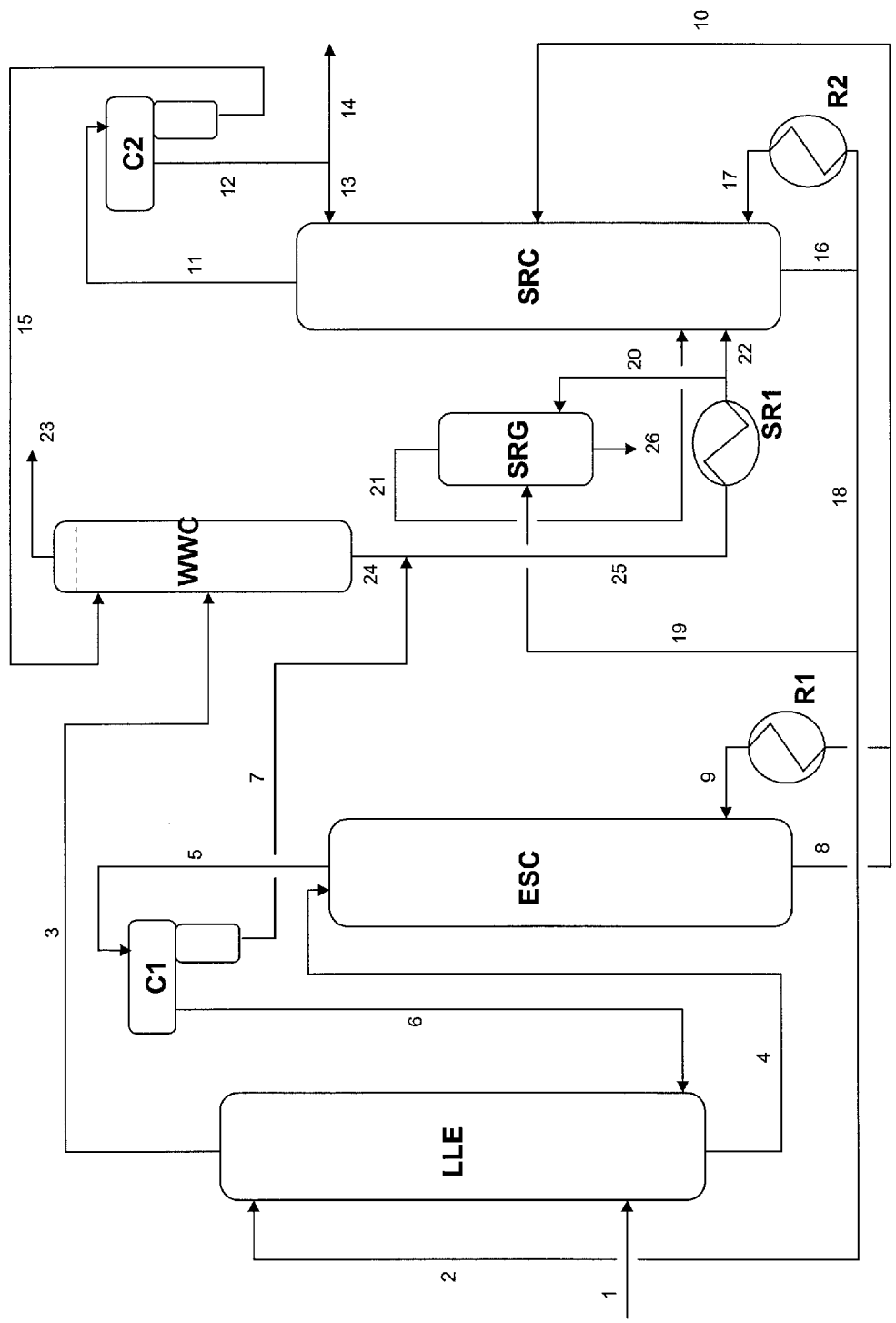
FIG. 4 is a schematic diagram of a prior art LLE process for aromatic hydrocarbons recovery from the aromatic and non-aromatic hydrocarbon mixtures, in which the solvent is regenerated through heating with steam stripping under reduced pressure in a solvent regenerator.

Referring to FIG. 4, this system is to demonstrate that a major portion of the heavy ($C_9^+$) hydrocarbons in the feed are removed in the liquid-liquid extraction (LLE) column by the raffinate stream. Only a minor portion of the $C_9^+$ hydrocarbons in the feed remains in the closed lean solvent loop and are eventually removed from the lean solvent through a solvent regenerator. This is one of the key features making the LLE process useful in recovering BTX aromatics from the full-boiling range ($C_6$-$C_8$) hydrocarbon feed.

Referring to FIG. 4, a full-boiling range feed was fed into a lower portion of a LLE column via line 1. Lean solvent (sulfolane with water) via line 16 extracted from a bottom portion of the SRC column was fed via line 2 to an upper portion of the LLE column under a pre-determined solvent-to-feed ratio. The raffinate stream was then withdrawn from a top portion of LLE column through line 3 and fed into a middle portion of a water washing column (WWC) to remove a minor amount of sulfolane from the raffinate. The washing water was collected from an overhead portion of the SRC and introduced into an upper portion of the WWC via line 15. The washed raffinate product was taken from the overhead of the WWC through line 23.

The extract stream of the LLE column was withdrawn from the bottom portion and fed to the top of an extractive stripper column (ESC) via line 4. Vapor of the light non-aromatic hydrocarbons were removed from the top of the ESC via line 5 and recycled to the lower portion of LLE column via line 6 after condensing and separating the water phase in a phase separator C1. Water from the phase separator C1 was sent via lines 7 and 25 to the steam generator SR1 for generating stripping steam for the SRC.

Rich solvent was withdrawn from the bottom portion of the ESC and sent to the middle of portion of the SRC through lines 8 and 10. Stripping steam generated from the SR1 was fed to lower portion of the SRC via line 22 to strip the aromatic hydrocarbons from the rich solvent. The vaporous aromatic hydrocarbons and steam were withdrawn from the top portion of the SRC via line 11 and the extract (aromatic) product was taken from line 14 after condensing and separating the water phase in a phase separator. Water from the phase separator was sent via line 15 as washing water to the WWC.

A portion of heavy ($C_9^+$) hydrocarbons are removed by the raffinate stream of LLE column and a portion of $C_{10}^+$ hydrocarbons were removed by the raffinate stream of the LLE column. $C_{11}$ hydrocarbons which contained only olefins and aromatics (more polar compounds tend to stay in extract stream with sulfolane). The remaining portion of $C_{10}^+$ hydrocarbons circulates in the closed solvent loop until they polymerized into heavier species having a boiling point which is higher than 287° C. (the boiling point of sulfolane) and is removed as sludge from the bottom of a solvent regenerator (SRG) through line 26. To continuously remove the sludge and the impurities generated from decomposed or oxidized sulfolane from the lean solvent, a split stream of the lean solvent was fed via line 19 to SRG, where sulfolane and lower boiling components were recovered under heating and steam stripping.

EXAMPLES

The following examples are presented to further illustrate different aspects and embodiments of the invention and are not to be considered as limiting the scope of the invention. Examples 1 to 3 demonstrate the effectiveness of water extraction (washing) for removing different types of heavy hydrocarbons from the lean solvent with or without the solvent regenerator.

Example 1

An amount of approximately 6 grams of cumene (presenting $C_9$ aromatic hydrocarbons) was added to 100 grams of sulfolane to make a homogeneous solution. To simulate a one-stage liquid-liquid extraction, 100 grams of the combined solution was thoroughly mixed with different amounts of deionized water in a separatory funnel at ambient temperature. The cumene and aqueous solvent phases were allowed to separate. The amounts of cumene phase measured for different runs are presented in Table 1.

TABLE 1

Cumene Phase Runs
Solvent Mixture: 100 grams containing 5.66 wt % cumene

| Water Add (grams) | Cumene Phase (grams) | Cumene Recovery (%) |
|---|---|---|
| 20 | 0.74 | 13.16 |
| 40 | 3.74 | 66.02 |
| 80 | 4.76 | 84.01 |
| 100 | 5.15 | 90.93 |
| 150 | 5.26 | 92.87 |
| 200 | 5.28 | 93.35 |

Table 1 shows that water extraction is very effective in removing cumene (heavy aromatics) from sulfolane. More than 90% of cumene was extracted from sulfolane (containing as high as 5.66% cumene) under a water-to-sulfolane weight ratio of 1.0 in a one-stage extraction. Extraction performance would be substantially better for sulfolane having much lower $C_9^+$ aromatics content, in a multi-stage counter-current extractor.

Example 2

An amount of 1.37 grams of decahydronaphthalene (DCHN) (presenting $C_{10}$ naphthenic hydrocarbons) was added to 100 grams of sulfolane to make a homogeneous solution. The solution was thoroughly mixed with 100 grams of the resulting solution and different amounts of deionized water in a separatory funnel at ambient temperature to allow the DCHN and aqueous solvent phases to separate. The amounts of cumene phase measured for different runs are presented in Table 2.

TABLE 2

Cumene Phase Runs
Solvent Mixture: 100 grams containing 1.35 wt % DCHN

| Water Add (grams) | DCHN Phase (grams) | DCHN Recovery (%) |
| --- | --- | --- |
| 10 | 0.3128 | 23.17 |
| 20 | 0.6377 | 47.24 |
| 40 | 0.8953 | 66.32 |
| 80 | 1.0055 | 74.48 |
| 150 | 1.0116 | 74.93 |
| 200 | 1.0975 | 81.30 |

Table 2 illustrates that the water extraction according to the present invention is very effective for removing DCHN (heavy naphthenes) from sulfolane. More than 80% of DCHN was extracted from sulfolane (containing as high as 1.35% DCHN) under a water-to-sulfolane weight ratio of 2.0 in one-stage extraction. Again, extraction performance would be substantially better for sulfolane solvent having much lower $C_9^+$ naphthenes content, in a multi-stage counter-current extractor.

Example 3

An amount of 0.29 grams of n-dodecane (n-$C_{12}$P) (presenting $C_{12}$ paraffinic hydrocarbons) was added to 100 grams of sulfolane to make a homogeneous solution. Again, a mix of 100 grams of sulfolane was thoroughly mixed and made of a solution with different amounts of deionized water in a separatory funnel at ambient temperature. The n-$C_{12}$P and aqueous solvent phases were allowed to separate. The amounts of n-$C_{12}$P phase measured for different runs are presented in Table 3.

TABLE 3 n-$C_{12}$P Phase Runs
Solvent Mixture: 100 grams containing 0.29 wt % n-$C_{12}$P

| Water Add (grams) | n-C12P Phase (grams) | n-$C_{12}$P Recovery (%) |
| --- | --- | --- |
| 20 | 0.0948 | 32.69 |
| 40 | 0.1485 | 51.21 |
| 80 | 0.2172 | 74.90 |
| 100 | 0.2731 | 94.17 |
| 150 | 0.2739 | 94.45 |

Table 3 shows that water extraction is very effective in removing n-$C_{12}$P (heavy paraffins) from sulfolane. Nearly 95% of n-$C_{12}$P was extracted from sulfolane (containing 0.29% n-$C_{12}$P) under a water-to-sulfolane weight ratio of 1.0 in one-stage extraction. Therefore, extraction performance would be substantially better for sulfolane having much lower $C_9^+$ paraffins content, in a multi-stage counter-current extractor.

Thus, the present invention reduces the high temperature and energy intensive requirements of conventional solvent regenerator. The difficult-to-operate conventional solvent regenerator and ED system is eliminated by utilizing a simpler method and steps for regenerating the ED solvent.

Those skilled in the art will appreciate and can design additional distillation systems suitable for utilizing the solvents of the present invention to reduce the amount of energy and increase the efficiency in the system and process. It is also understood that the design of this system and calculated methods can be used in new plant constructions as well as incorporated into a retrofit or revamp situation where a portion or all of the existing plant structures, columns, strippers, exchangers and the like are reused towards the present invention.

It will also be appreciated by one skilled in the art that various column design means may be utilized in the construction of towers and columns to be used in the plants according to the present invention. These columns may utilize tray designs, random and structured packings, rotating discs, microdispersion valves, pulse column designs, multi-stage mixers and settlers or any other rotating type contactor. The decanters, stripping columns and steam generators may also be constructed of conventional and prior art designs.

Having now fully described the invention, it will be understood by those of ordinary skill in the art that the same can be performed within a wide and equivalent range of conditions, designs and other parameters without affecting the scope of the invention or any embodiment thereof. All patents, patent applications and publications cited herein are fully incorporated by reference herein in their entirety.

What is claimed is:

1. A method for recovering a polar hydrocarbon selective, water-soluble aqueous solvent substantially free of hydrocarbons and other impurities from a solvent-rich stream containing said selective aqueous solvent, water, a measurable amount of heavy hydrocarbons, and sludge generated from the reactions of a thermally decomposed or oxidized solvent, heavy hydrocarbons, and additives, the method comprising the steps of:

a. introducing a feed containing polar and non-polar hydrocarbons into a middle portion of an extractive distillation column (EDC) and introducing a solvent-rich stream into an upper portion of the EDC as the selective solvent feed;

b. recovering a water-containing non-polar hydrocarbon-rich stream from the upper portion of the EDC and withdrawing a first solvent-rich stream containing said aqueous solvent and said polar hydrocarbons from a bottom portion of the EDC;

c. introducing the said first solvent-rich stream into a middle portion of a solvent recovery column (SRC), recovering a polar hydrocarbon-rich stream, substantially free from said aqueous solvent and said non-polar hydrocarbons, from an upper portion of the SRC, and removing a second solvent-rich stream from a bottom portion of the SRC;

d. introducing a greater portion of said second solvent-rich stream into the upper portion of the EDC in step (a) as the selective solvent feed and introducing a minor fraction of said second solvent-rich stream into an upper portion of a solvent regeneration zone, recovering a third solvent-rich stream containing said aqueous solvent, water and any hydrocarbons and other compounds having boiling points lower than or equal to that of said aqueous solvent, from the upper portion of the solvent regeneration zone, and removing any heavy sludge from a lower portion of the solvent regeneration zone;

e. separating water from said non-polar hydrocarbon-rich stream removed from the upper portion of the EDC in step (b), and separating water from a polar hydrocarbon-rich stream from the upper portion of the SRC in step (c);

f. introducing all or a part of said water separated in step (e) into a lower portion of a solvent washing zone;

g. condensing and cooling said third solvent-rich stream in step (d) and introducing said third solvent-rich stream into a solvent washing zone through a point above the section where said water in step (f) is introduced, recovering said aqueous solvent in an aqueous phase and rejecting said heavy hydrocarbons in an oil phase;

h. withdrawing an accumulated oil phase containing said heavy hydrocarbons from an upper portion of the solvent washing zone, recovering an aqueous phase containing said aqueous solvent from a lower portion of the solvent washing zone, and discharging any sludge from the bottom portion of the solvent washing zone;

i. introducing said aqueous phase from the solvent washing zone in step (h) into a steam generator and vaporizing the aqueous phase to form steam; and j. feeding a portion of steam generated from step (i) into the lower portion of the solvent regeneration zone, and feeding the remaining portion of steam generated from step (i) into the lower portion of the SRC.

2. The method according to claim 1 wherein said steam is introduced into a steam generator to produce energy before feeding into the solvent regeneration zone and/or the SRC.

3. The method according to claim 1 wherein said polar hydrocarbons are aromatic and said non-polar hydrocarbons are paraffinic, naphthenic, and olefinic.

4. The method according to claim 1 wherein the solvent washing zone is a continuous multi-stage counter-current contacting device, including a column with trays, a column with packings, a column with rotating discs, a pulse column, multi-stage mixers/settlers, or any other rotating type contactor.

5. The method according to claim 1 wherein the solvent washing zone is a simple water tank serving as a decanter to separate heavy hydrocarbons and any sludge from the aqueous phase containing primarily the solvent and water.

6. The method according to claim 1 wherein the solvent regeneration zone is a continuous multi-stage contacting device, including a column with trays or a column with packings, with a reboiler.

7. The method according to claim 1 wherein the EDC is operated under such conditions to maximize the benzene recovery in said first solvent-rich stream by keeping substantially all $C_9^+$ hydrocarbons in said first solvent-rich stream.

8. The method according to claim 1 wherein said SRC is operated under such conditions to strip only $C_8$ and lighter hydrocarbons from said first solvent-rich stream and to keep substantially all $C_9$ and heavier hydrocarbons in said second solvent-rich stream.

9. The method according to claim 1 wherein the solvent washing zone is operated at a temperature of 0° to 100° C. and a pressure of 1 to 100 atmospheres.

10. The method according to claim 9 wherein the solvent washing zone is operated at a temperature of 25° to 80° C. and a pressure of 1 to 10 atmospheres.

11. The method according to claim 1 wherein the solvent washing zone is operated under a washing water-to-solvent feed weight ratio of 0.1 to 100.

12. The method according to claim 11 wherein the solvent washing zone is operated under a washing water-to-solvent feed weight ratio of 0.5 to 10.

13. The method according to claim 1 wherein the solvent regeneration zone is operated at a temperature of 150° to 200° C., and a pressure of 0.1 to 10 atmospheres.

14. The method according to claim 13 wherein the solvent regeneration zone is operated at a temperature of 160° to 180° C., and a pressure of 0.1 to 0.8 atmospheres.

15. The method according to claim 1 wherein the solvent regeneration zone is operated under a steam-to-solvent weight from 0.01 to 5.0.

16. The method according to claim 15 wherein the solvent regeneration zone is operated under a steam-to-solvent weight from 0.1 to 2.0.

17. The method according to claim 1 wherein said water-soluble, aqueous solvent is selected from the list comprising sulfolane, alkyl-sulfolane, N-formyl morpholine, N-methyl pyrrolidone, tetraethylene glycol, triethylene glycol, diethylene glycol, and mixtures thereof.

18. The method according to claim 17 wherein said water-soluble solvent is aqueous sulfolane.

19. The method according to claim 17 wherein said water-soluble solvent is aqueous N-formyl morpholine.

20. The method according to claim 17 wherein said water-soluble solvent is aqueous N-methyl pyrrolidone.

21. The method according to claim 17 wherein said water-soluble solvent is aqueous tetraethylene glycol.

22. A method for recovering a polar hydrocarbon selective, water-soluble solvent substantially free of hydrocarbons and other impurities from a solvent-rich stream containing the aqueous solvent, water, a measurable amount of heavy hydrocarbons, and sludge generated from reactions of a thermally decomposed or oxidized solvent, heavy hydrocarbons and additives, the method comprising the steps of:

a. introducing a feed containing polar and non-polar hydrocarbons into a middle portion of an extractive distillation column (EDC) and introducing a solvent-rich stream into an upper portion of the EDC as the selective solvent feed;

b. recovering a water-containing non-polar hydrocarbon-rich stream from the upper portion of the EDC and withdrawing the first solvent-rich stream containing said aqueous solvent and said polar hydrocarbons from a lower portion of the EDC;

c. introducing the said first solvent-rich stream into a middle portion of a solvent recovery column (SRC), recovering a polar hydrocarbon-rich stream, substantially free from solvent and non-polar hydrocarbons, from an upper portion of the SRC, and removing a second solvent-rich stream from a lower portion of the SRC;

d. introducing a greater portion of said second solvent-rich stream into the upper portion of the EDC in step (a) as the selective solvent feed and introducing a minor portion of said second solvent-rich stream into an upper portion of a solvent washing zone;

e. separating water from said non-polar hydrocarbon-rich stream removed from the upper portion of the EDC in step (b), and separating water from said polar hydrocarbon-rich stream from the upper portion of the SRC in step (c);

f. introducing all or a part of said water separated in step (e) into a lower portion of the solvent washing zone at a point below where the minor portion of said second solvent-rich stream in step (d) is fed into the solvent washing zone;

g. recovering said aqueous solvent in the aqueous phase and rejecting said heavy hydrocarbons in the oil phase in the solvent washing zone;

h. withdrawing an accumulated oil phase containing said heavy hydrocarbons from the upper portion of the solvent washing zone, recovering an aqueous phase containing said aqueous solvent from the lower portion of the solvent washing zone, and discharging any sludge from lower portion of the solvent washing zone;

i. introducing said aqueous phase from the solvent washing zone in step (h) into a steam generator and vaporizing the aqueous phase to form steam; and j. introducing the steam generated from step (i) into the lower portion of the SRC.

23. The method according to claim 22 wherein said polar hydrocarbons are aromatic and said non-polar hydrocarbons are paraffinic, naphthenic, and olefinic.

24. The method according to claim 22 wherein the solvent washing zone is a continuous multi-stage, counter-current contacting device, including a column with trays, a column with packings, a column with rotating discs, a pulse column, multi-stage mixers/settlers, or any other rotating type contactor.

25. The method according to claim 22 wherein the solvent washing zone is a water tank serving as a decanter to separate the heavy hydrocarbons and any sludge from the aqueous phase containing primarily solvent and water.

26. The method according to claim 22 wherein the EDC is operated under such conditions to maximize the benzene recovery in said first solvent-rich stream by keeping substantially all $C_9^+$ hydrocarbons in said first solvent-rich stream.

27. The method according to claim 22 wherein the SRC is operated under such conditions to strip only $C_8$ and lighter hydrocarbons from said first solvent-rich stream and to keep substantially all $C_9$ and heavier hydrocarbons in said second solvent-rich stream.

28. The method according to claim 22 wherein the solvent washing zone is operated at a temperature of 0° to 100° C. and a pressure of 1 to 100 atmospheres.

29. The method according to claim 28 wherein the solvent washing zone is operated at a temperature of 25° to 80° C. and a pressure of 1 to 10 atmospheres.

30. The method according to claim 22 wherein the solvent washing zone is operated under a washing water-to-solvent feed weight ratio of 0.1 to 100.

31. The method according to claim 30 wherein the solvent washing zone is operated under a washing water-to-solvent feed weight ratio of 0.5 to 10.

32. The method according to claim 22 wherein said water-soluble, aqueous solvent is selected from the list comprising sulfolane, alkyl-sulfolane, N-formyl morpholine, N-methyl pyrrolidone, tetraethylene glycol, triethylene glycol, diethylene glycol, and mixtures thereof.

33. The method according to claim 32 wherein said water-soluble solvent is aqueous sulfolane.

34. The method according to claim 32 wherein said water-soluble solvent is aqueous N-formyl morpholine.

35. The method according to claim 32 wherein said water-soluble solvent is aqueous N-methyl pyrrolidone.

36. The method according to claim 32 wherein said water-soluble solvent is aqueous tetraethylene glycol.

37. A system for recovering a polar hydrocarbon selective, water-soluble solvent from a solvent-rich stream containing the selective solvent, water, a measurable amount of heavy hydrocarbons, and sludge generated from reactions of a thermally decomposed or oxidized solvent, heavy hydrocarbons and additives, comprising:
   a. a feed stream containing polar and non-polar hydrocarbons fed into a middle portion of an extractive distillation column (EDC) and a solvent-rich stream fed into an upper portion of the EDC as a selective solvent feed;
   b. a water-containing non-polar hydrocarbon-rich stream recovered from the upper portion of the EDC and a first solvent-rich stream containing the selective solvent and the polar hydrocarbons withdrawn from a lower portion of the EDC;
   c. the first solvent-rich stream being fed into a middle portion of a solvent recovery column (SRC), and a polar hydrocarbon-rich stream, substantially free from solvent and non-polar hydrocarbons, recovered from an upper portion of the SRC, and a second solvent-rich stream removed from a lower portion of the SRC;
   d. a greater portion of the second solvent-rich stream being fed into the upper portion of the EDC as the selective solvent feed and a minor portion of the second solvent-rich stream fed into an upper portion of a solvent washing zone;
   e. a water separating means wherein water is separated from the non-polar hydrocarbon-rich stream removed from the upper portion of the EDC and water is separated from the polar hydrocarbon-rich stream removed from the upper portion of the SRC; and all or a part of the water from the water separating means is fed into a lower portion of the solvent washing zone at a level below where a minor portion of the second solvent-rich stream is introduced into the solvent washing zone;
   f. a recovery zone wherein the selective solvent in the aqueous phase is recovered and the heavy hydrocarbons is rejected in an oil phase in the solvent washing zone, the heavy hydrocarbons are withdrawn in an accumulated oil phase from the upper portion of the solvent washing zone and the aqueous phase containing the selective solvent is recovered from the lower portion of the solvent washing zone and any sludge is discharged from a lower portion of the solvent washing zone;
   g. a vaporizing means wherein the aqueous phase from the solvent washing zone is fed into a steam generator and vaporized to form steam; and
   h. a steam recovery zone wherein the steam generated from the vaporizing means is returned to the lower portion of the SRC.

38. The system according to claim 37 wherein the selective solvent is substantially free of hydrocarbons and other impurities.

39. The system according to claim 37 wherein energy is produced from the generation of steam in the steam recovery zone.

40. The system according to claim 37 wherein the polar hydrocarbons are aromatic and the non-polar hydrocarbons are paraffinic, naphthenic, and olefinic.

41. The system according to claim 37 wherein the solvent washing zone is a continuous multi-stage, counter-current contacting device, including a column with trays, a column with packing means, a column with rotating discs, pulse column, multi-stage mixers/settlers, or any other rotating type contactor.

42. The system according to claim 37 wherein the solvent washing zone is a water tank serving as a decanter to separate the heavy hydrocarbons and any sludge from the aqueous phase containing primarily solvent and water.

43. The system according to claim 37 wherein the EDC is operated under such conditions to maximize benzene recovery in the first solvent-rich stream by keeping substantially all $C_9^+$ hydrocarbons in the first solvent-rich stream.

44. The system according to claim 37 wherein the SRC is operated under such conditions to strip only $C_8$ and lighter hydrocarbons from the first solvent-rich stream and to keep substantially all $C_9$ and heavier hydrocarbons in the second solvent-rich stream.

45. The system according to claim 37 wherein a portion of the steam from the steam recovery zone is fed into a solvent regeneration zone.

46. The system according to claim 37 wherein the solvent washing zone is operated at a temperature of 0° to 100° C. and a pressure of 1 to 100 atmospheres.

47. The system according to claim 46 wherein the solvent washing zone is operated at a temperature of 25° to 80° C. and a pressure of 1 to 10 atmospheres.

48. The system according to claim 37 wherein the solvent washing zone is operated under a washing water-to-solvent feed weight ratio of 0.1 to 100.

49. The system according to claim 48 wherein the solvent washing zone is operated under a washing water-to-solvent feed weight ratio of 0.5 to 10.

50. The system according to claim 37 wherein the water-soluble, aqueous solvent is selected from the list comprising sulfolane, alkyl-sulfolane, N-formyl morpholine, N-methyl pyrrolidone, tetraethylene glycol, triethylene glycol, diethylene glycol, and mixtures thereof.

51. The system according to claim 50 wherein the water-soluble solvent is aqueous sulfolane.

52. The system according to claim 50 wherein the water-soluble solvent is aqueous N-formyl morpholine.

53. The system according to claim 50 wherein the water-soluble solvent is aqueous N-methyl pyrrolidone.

54. The system according to claim 50 wherein the water-soluble solvent is aqueous tetraethylene glycol.

* * * * *